(12) United States Patent  (10) Patent No.: US 7,323,990 B2
Urban  (45) Date of Patent: Jan. 29, 2008

(54) METHOD AND APPARATUS FOR PLACING ID TAGS IN MOLDED ARTICLES

(75) Inventor: Brian J. Urban, East Sandwich, MA (US)

(73) Assignee: Sencorp Inc., Hyannis, MA (US)

( * ) Notice: Subject to any disclaimer, the term of this patent is extended or adjusted under 35 U.S.C. 154(b) by 211 days.

(21) Appl. No.: 11/087,343

(22) Filed: Mar. 23, 2005

(65) Prior Publication Data

US 2005/0237195 A1  Oct. 27, 2005

Related U.S. Application Data

(60) Provisional application No. 60/521,442, filed on Apr. 27, 2004.

(51) Int. Cl.
*G08B 13/14* (2006.01)
(52) U.S. Cl. .................. 340/572.1; 340/572.3; 340/572.4; 340/572.8; 340/539.13; 340/539.27; 425/290; 425/398; 425/444
(58) Field of Classification Search .......... 340/572.1, 340/572.3, 572.4, 572.8, 539.13, 539.27, 340/825.49; 235/383, 385, 492; 425/290, 425/292, 398, 444
See application file for complete search history.

(56) References Cited

U.S. PATENT DOCUMENTS

| | | | |
|---|---|---|---|
| 4,708,630 A * | 11/1987 | Hammond | 425/504 |
| 4,854,850 A * | 8/1989 | Hautemont | 425/503 |
| 5,017,125 A * | 5/1991 | Finnah | 425/504 |
| 5,868,986 A | 2/1999 | Foulkes | |
| 5,879,722 A * | 3/1999 | Andersen et al. | 156/501 |
| 6,135,756 A * | 10/2000 | Arends | 425/398 |
| 6,294,114 B1 | 9/2001 | Muirhead | |
| 6,483,434 B1 | 11/2002 | UmiKer | |
| 6,661,339 B2 | 12/2003 | Muirhead | |
| 6,749,419 B2 | 6/2004 | Nightingale et al. | |
| 6,778,089 B2 | 8/2004 | Yoakum | |
| 6,943,678 B2 * | 9/2005 | Muirhead | 340/505 |
| 2004/0094949 A1 | 5/2004 | Savagian et al. | |
| 2004/0104506 A1 | 6/2004 | Schelmbauer et al. | |
| 2004/0238623 A1 | 12/2004 | Asp | |
| 2005/0068182 A1 | 3/2005 | Dunlap et al. | |
| 2005/0241548 A1 | 11/2005 | Muirhead | |

* cited by examiner

*Primary Examiner*—Hung Nguyen
(74) *Attorney, Agent, or Firm*—Blackwell Sanders LLP

(57) ABSTRACT

A thermoforming apparatus and method are provided. An identification tag such as a radio frequency identification tag is provided for molding into or attaching to a thermoformed article during the thermoforming process. The tag may be attached to the article by mechanical interlocking and/or a heat sensitive adhesive. The identification tag is applied to the article while the article is being formed in the thermoforming mold.

29 Claims, 5 Drawing Sheets

METHOD AND APPARATUS FOR PLACING ID TAGS IN MOLDED ARTICLES

CROSS-REFERENCE TO RELATED APPLICATION

This patent application claims priority to U.S. Provisional Patent Application Ser. No. 60/521,442 filed Apr. 27, 2004.

BACKGROUND OF INVENTION

A wide variety of plastic (polymeric) articles may be made using a thermoforming method and apparatus. A typical thermoforming process performs a series of operations on a heat formable sheet of polymeric material. Typically, thermoplastics are used as is well known in the art. The formation operations include feeding material to the forming press, heating the material, pressure forming the material into article precursors, trimming the excess material connecting the articles, and stacking the formed and separated articles. The molding material feed/unwind station of a typical thermoform machine provides a sheet of material to the machine. This can be accomplished by either unwinding material from a continuous roll of polymeric material or by feeding individual sheets of polymeric material into the machine. Once the material enters the machine, the material travels to a heating station where it is heated to its forming temperature above its glass transition phase temperature, and below its melting temperature, as is known as the art. The heated material is then moved into a forming station where it undergoes a forming operation. The material may be heated at the forming station if desired. During the forming operation the heated polymeric material is formed into specific shapes using force. Force may be applied through a pressure differential, such as vacuum (a subatmospheric pressure) applied to one surface or a high air pressure (an above atmospheric pressure) applied to another surface or a combination of both and/or by pressure forming the parts using male/female mold portions mounted to upper and lower press platens. The material may be formed by being captured between the male and female portions with the female portion of the mold moving onto the male portion of the mold to pressure form the article precursors. The end result of the process is the production of one molded article or an array of molded articles formed from the sheet material. Typically, an array of articles is formed. The molded article precursors are then moved to a trimming station where one or more of a variety of cutting methods and means such as steel rule and forged die may be employed to remove the surrounding support area around the thermoformed article precursor to form the articles. Typically, a web of excess material is formed between the various article precursors which web is cut free and removed. The scrap material may then be removed and saved for potential recycling. Such a process is disclosed in patent application Ser. No. 10/605,856 filed Oct. 31, 2003 entitled "Robotic Method And Apparatus For Removing Parts From The trim Press Of A Thermoforming System" which disclosure is incorporated herein by reference.

A typical trim station cuts the thermoformed array free from the web of interstitial material with the exception of a few small areas known in the art as "nicks." These "nicks" hold the various parts in the sheet for transportation out of the trim press and to a stacker station that breaks these molded parts free from the web and presents them in stacks for removal. There are two common methods employed by stackers namely, upstacking and downstacking. Upstacking is accomplished using a vertically driven tool that cycles up and down freeing the mold apart from the web of material and stacking them above the web in the process. Many of the formed parts or articles are useable either as components of other articles, as the article itself or as packaging components for packaging for articles.

There is a trend toward the use of ID tags such as radio frequency identification tags (RFID) as a component part of consumer products. These devices can be "scanned" at a retail outlet to identify the product and to provide a signal that will allow checkout equipment to know what product is being scanned and determine its price. The price can then be printed on a sales slip. The price of one product is used in combination with other product prices to determine the total bill. Inventory control can also be accomplished using an ID tag. Some retailers are mandating the use of RFIDs to replace the UPC barcode. RFIDs tend to be small and will likely become much smaller in time. The incorporation of RFIDs into the product or the product packaging in a simple manner is becoming important. However, cost of the installation of an ID tag into a package or an article is of the utmost importance since many retailers may shortly not accept a product without an ID tag as they will not accept a product today without UPC barcode. Many products are very inexpensive and of low margin so added cost is a problem. The ID tag should be attached in a manner that it will not be accidentally separated from the package or article and in essence become an integral part of the article or package in an inexpensive and reliable manner.

SUMMARY OF INVENTION

The present invention relates to a method and apparatus for integrating an ID tag such as an RFID into an article, a component of an article, or a package herein collectively referred to as "article." The apparatus for attaching an ID tag to an article includes a thermoforming machine particularly at the forming press station of the thermoformer. Apparatus is provided for placing an ID tag at a preselected position relative to a mold component mounted in the forming press. In a first embodiment, each mold component of a mold half has an ID tag moved into position on the mold component by a carrier pin arrangement. The ID tag is separated from a carrier strip and moved into position by the carrier pin to its respective mold component. In a second embodiment, a robotic carrier removes an ID tag for each mold component carried by one of the platens of the forming press from a magazine and when the mold is open, places an ID tag on each of the mold components at a pre-selected location thereon. The polymeric sheet is moved into position and during the thermoforming process an ID tag is secured to each of the article portions of the formed sheet. Securement in either embodiment can be by mechanical interlocking and/or adhesion and requires only one layer of material to effect securement in a formed pocket.

The present invention also includes a method for molding an article and attaching an ID tag to the article. An ID tag is positioned at a predetermined location on a mold component or mold components carried by one of the platens. A heat/pressure formable polymeric sheet is moved into position and during the molding process the ID tag at each of the mold components is secured to each of the article precursors being formed. The securement can be by mechanical interlocking and/or adhesion.

DETAILED DESCRIPTION

Figure 1:
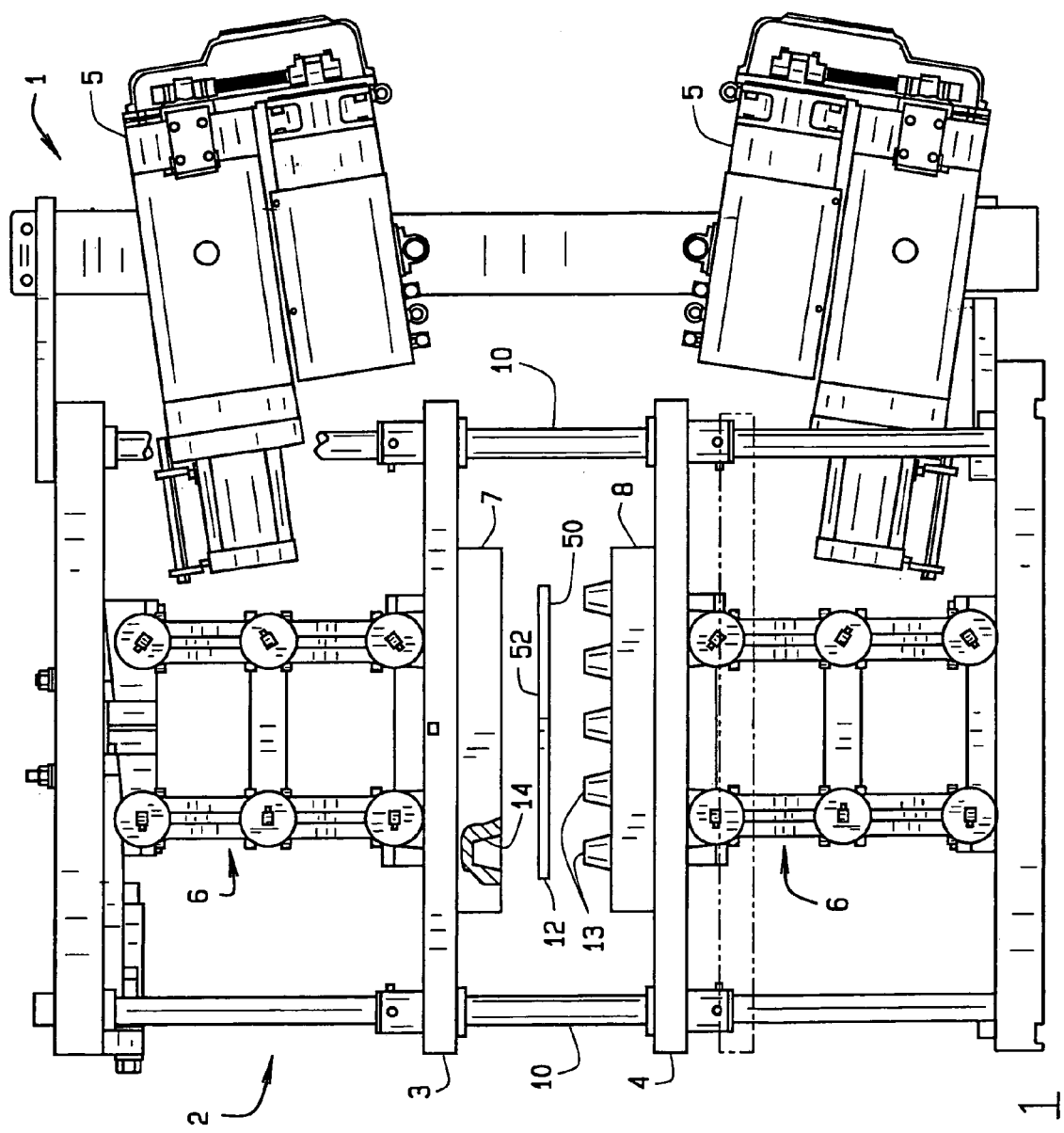
FIG. 1 is a side elevation view of a thermoforming machine.
Figure 2:
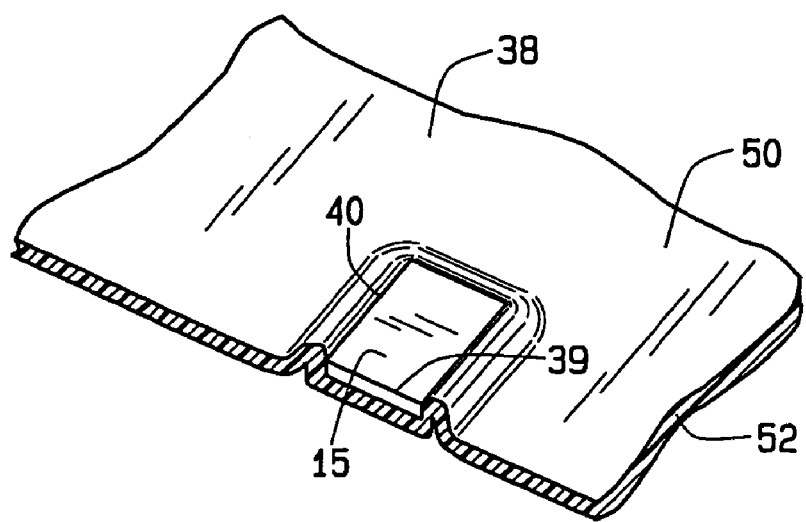
FIG. 2 is an enlarged fragmentary perspective view of an article showing details of the securement of an ID tag to the article as seen from the ID tag side of the article.
Figure 3:
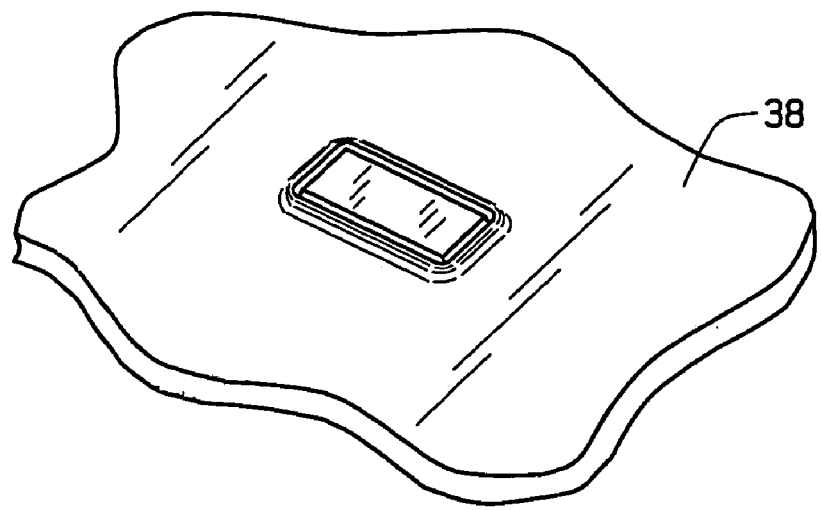
FIG. 3 is an enlarged fragmentary perspective view similar to FIG. 2 but showing the reverse side of the article as that shown in FIG. 2.

The reference numeral 1 designates generally a thermoforming machine. The thermoforming machine 1 includes a forming press 2 preferably with upper and lower platens 3, 4 (FIG. 1) with at least one of the platens being movable relative to the other. Typically, both of the upper and lower platens 3, 4 move, although, only one need move. In the illustrated structure the upper platen 3 moves downwardly towards the lower platen 4 and vice versa. Each of the platens 3, 4 is operably associated with a respective power drive 5 for selectively moving the platen. As illustrated, each of the drives 5 includes a toggle mechanism 6 to effect movement of the respective platen 3, 4. As shown, each of the platens 3, 4 carries a mold half 7, 8, respectively. It is to be understood however, that one of the mold halves may be eliminated which may either be the female mold half 7 or the male mold half 8 depending upon the type of article being manufactured. The mold halves 7, 8 and platens 3, 4 are mounted on a plurality of columns 10 with at least one of the platens, and as shown both, being movably mounted on four columns 10. The columns 10 keep the mold halves 7, 8 in proper alignment.

A suitable polymeric material for thermoforming is provided. The material 12 may be in the form of individual sheets or as a continuous strip fed from a roll or the like. The movement of a strip form of material 12 is indexed for timed movement relative to the opening and closing of the mold halves 7, 8. Alternatively, individual sheets of thermoformable material may be provided with each sheet being fed individually upon each cycle of the thermoforming machine 1. A suitable heating device 16 is provided for heating the material 12 either prior to its entry between the platens 7, 8 or after it has entered the thermoforming machine 1. Such thermoforming machines are well known in the art. An example of such a machine is a Model 2500 made by Sencorp, Inc, of Hyannis, Mass. While a forming press 2 is shown as having upper and lower platens and mold halves and associated components it is to be understood that in some embodiments of the present invention only one mold half and one platen need be used and the mold and platen may be stationary.

Figure 4:
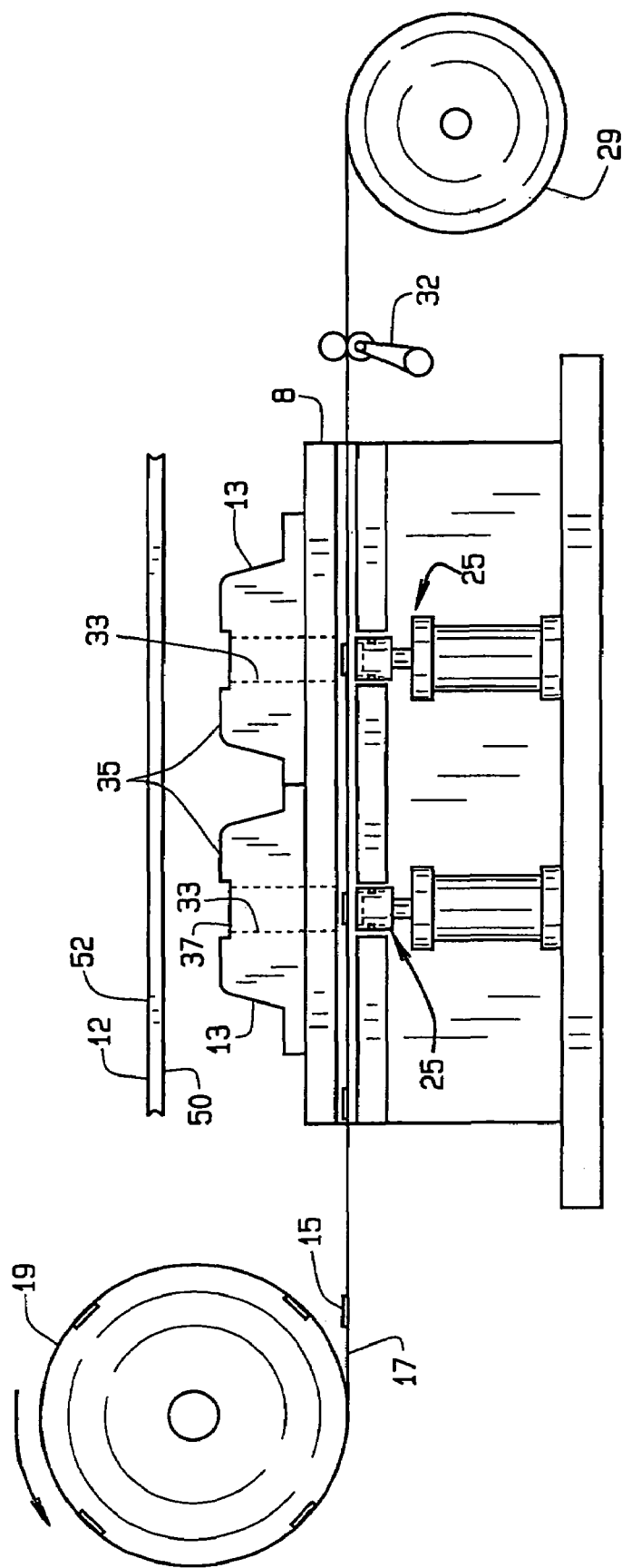
FIG. 4 is a fragmentary side elevation schematic view of a portion of the lower platen of the thermoforming machine showing details of one embodiment of an ID tag-inserting device.
Figure 5:
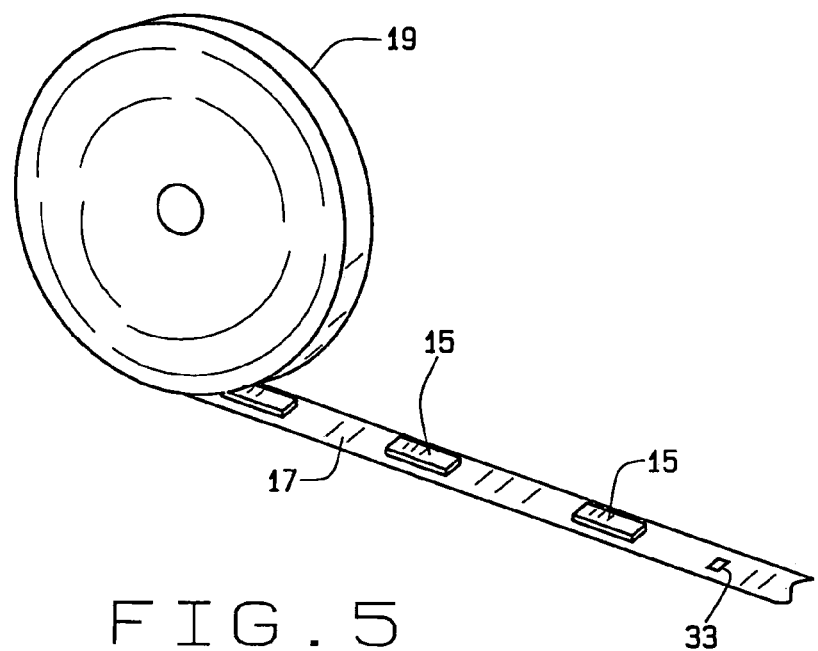
FIG. 5 is a perspective view of a carrier strip having ID tags secured thereto.
Figure 6:
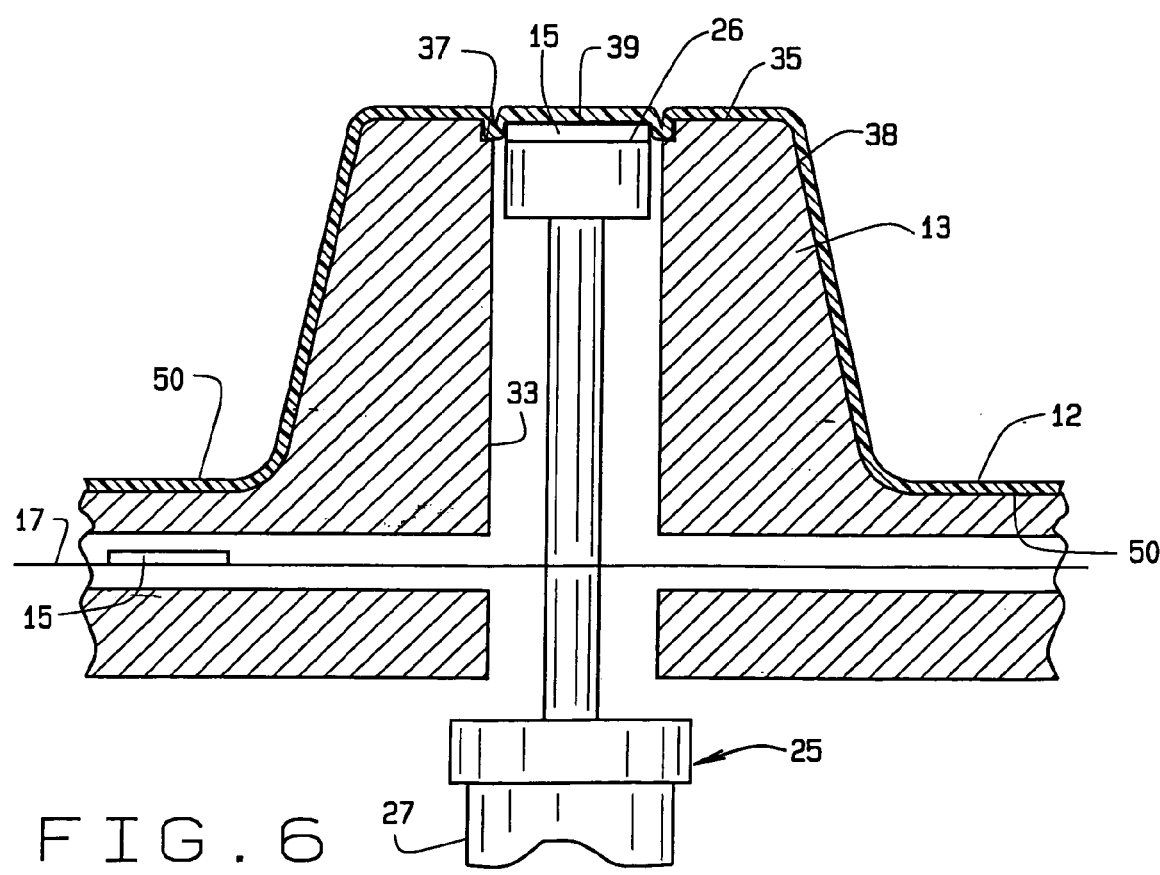
FIG. 6 is an enlarged fragmentary sectional view of a portion of the ID tag feed device shown in FIG. 4 with the ID tag in a position for attachment to the sheet of material formed to produce an article.

As best seen in FIGS. 4, 5, ID tags 15 such as RFIDs are carried by a carrier strip 17 fed from a supply 19 such as a roll. An ID tag 15 of another type may also be used and will preferably contain data about an article in electronic form and is readable remote from the ID tag. An RFID transmits product identity information by radio frequency upon command by a signal reader. Each of the mold components 13, FIGS. 4, 6, has an ID tag carrier pin assembly 25 associated therewith having a carrier pin 26 and drive 27. In a preferred embodiment, there is one pin 26 per mold component 13. Each pin assembly 25 includes a movable carrier pin 26. All pins 26 may be associated with a single and common drive 27. The pins 26 are each mounted to a drive 27 for selectively moving the pins 26 between extended and retracted positions. In their retracted positions, the pins 26 are in a position behind the exposed molding surface of the mold component 13 or 14 to receive thereon an ID tag 15 for movement from a loading position as seen FIG. 4 to an installation position as seen in FIG. 6. The ID tags 15 are suitably separated from the carrier strip 17 as for example by providing a slit or a hole in the carrier strip, or by cutting the ID tag 15 from the carrier strip 17 as for example by die cutting, using the peripheral edge of the pin 26 as a portion of a cutter device. Perforations in the carrier strip 17 may also be provided to help facilitate separation of the ID tag 15 from the carrier strip 17.

In a preferred embodiment, the mold components 13, 14 are arrayed and rows and columns and there will be a carrier strip 17 provided for each row of pins 26. A drive 29 is provided for indexing movement of the carrier strip 17 and indexing the ID tags 15 each to a respective position over the respective pins 26. The drive 29 suitably indexes the carrier strip 17 with ID tags 15 in the appropriate locations, for example, by an optical system utilizing an optical sensor 32 to locate an indexing mark 33 on the carrier strip telling the drive 29 that the ID tags 15 are in the appropriate position and to stop movement. When the ID tags 15 are in the appropriate position, the pins 26 will move through guide channels 33 in the mold component 13 carrying the separated ID tags to the desired position relative to the mold component 13. As seen in FIGS. 4, 6, the ID tag 15 is preferably located on an upwardly facing surface 35 of the mold component 13 and is held in position by a retaining means as by being located in a shallow recess or pocket 37. The pocket 37 will prevent movement of the ID tag 15 since air flow utilized during the forming process might dislodge the ID tag from its position on its mold component 13 creating a scrap article 38. It is preferred that the pins 26 move the ID tag 15 to an upwardly facing generally horizontal surface so that gravity will help retain the ID tag in position. Other positions may be utilized. If desired, the ID tag 15 may be positioned on a downwardly facing surface or an inclined surface. To do this, means will be needed to retain the ID tag 15 to the pin 26. Examples of such retaining means include a vacuum retainer on each of the pins 26. During the molding operation, the ID tags 15 may be in position prior to forming an article 38 precursor over the mold components 13 or may be moved into position after forming of the article while the material 12 is still warm enough to, in one embodiment, mechanically lock, as with an overlapping ridge 40, the ID tag 15 to the formed material by the ID tag forming a recess or pocket 39 in the formed article 38 precursor. The ID tag 15 can be attached to the article 38 precursor in any suitable manner including the just-mentioned mechanical form of attachment. During the forming process, a pocket 42 with an open face 43 is formed and one surface 44 of the tag 15 is exposed. In the illustrated structure, the overlapping ridge 40 extends around the peripheral edge of the ID tag 15 and pocket 42 and preferably overlies a portion of an outwardly facing surface 44 of the ID tag. The ridge 40 need not extend around the entirety of the ID tag but a sufficient portion of the periphery to lock the ID tag 15 into place on the article 38 precursor. Locking is by cooperative inter-engagement between a portion of the article 38 precursor and at least a portion of the ID tag 15. Mechanical attachment could also be achieved by cooperative inter-engagement between a portion of the article 38 precursor and a groove or recess provided in a portion of the periphery of the ID tag 15. Also, one or more apertures may be provided through the ID tag 15 or in material comprising the article 38 precursor will form into the one or more apertures to provide the mechanical attachment. Additionally, one or more of the apertures may be provided with a tapered contour providing a smaller opening on the side of the ID tag 15 adjacent to the material 12 to form an inwardly projecting ridge over which material 12 may be formed to lock the ID tag 15 to the article 38 precursor. The outer periphery of the ID tag 15 may be inclined outwardly from the exposed surface to the surface contacting the material 12. Material forming over the edge adjacent to the material will mechanically lock the ID tag to the article 38 precursor. Other suitable forms of mechanical attachment may also be utilized. In an alternate embodiment, the ID tag 15 may be provided with a heat sensitive adhesive which could be used to secure the ID tag 15 either to the article 38 precursor during or after its formation molding process. Because the ID tag 15 may be heat sensitive, it is desirable to accomplish its attachment to the article 38 precursor without overheating the ID tag 15. The particular method of attachment as described above, will be selected depending upon the temperature of the heated material 12 and the sensitivity of the ID tag 15 to heat. While an RFID-type of ID tag 15 is preferred, it is to be understood that other types of ID tags could be attached as described for an RFID. Such ID tag 15 can be of any suitable type including a tag with a barcode or other machine-readable device. After the array of article 38 precursors has been formed and suitably cooled for removal from the mold component 13, the formed array of articles will be removed from the mold component 13 and transferred to a cutting station such as that disclosed in our co-pending application Ser. No. 10/605,856, referenced above, the disclosure of which is incorporated herein by reference. The article 38 precursors, after separation, are then completed or finished articles.

Figure 7:
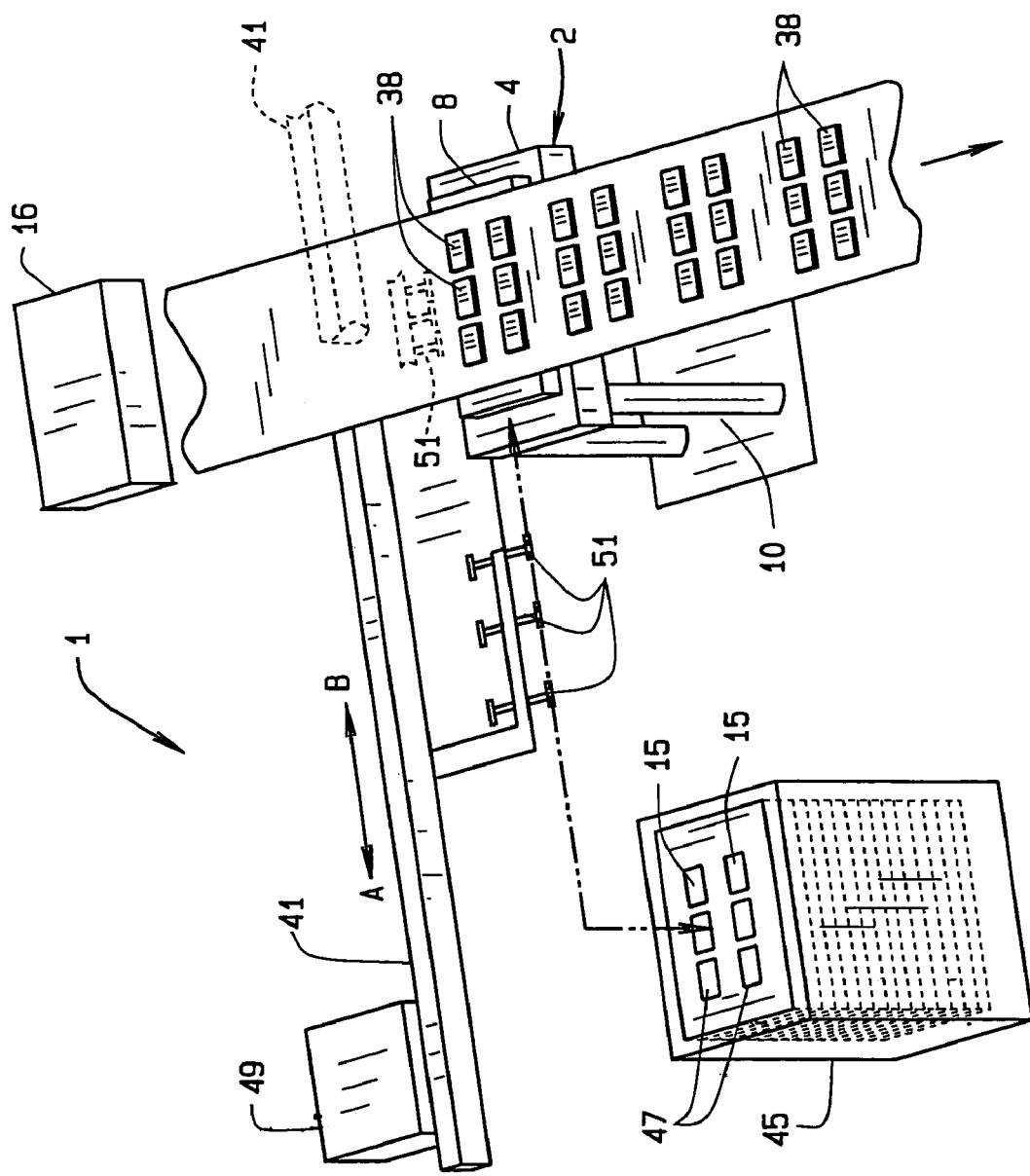
FIG. 7 is a perspective schematic view of a second embodiment of a device for removing ID tags from a magazine and applying the ID tags to portions of the thermoforming mold.

FIG. 7, shows an alternative embodiment of a device for placing ID tags 15 or tags into position on each of the mold components 13 or 14 for forming respective article 38 precursors. In this embodiment, a robotic arm 41 is movable between a position A for removing a preselected number of ID tags from a magazine 45 having a plurality of ID tag storage mechanisms 47. The magazine 45 can be either a top feed or a bottom feed type. In the illustrated top feed type magazine, the ID tags 15 are exposed at the top of each of the storage mechanisms 47 and available for removal by the robotic arm. In a bottom feed type magazine the bottom positioned ID tag 15 would be available for pick up by the robotic arm 41. The robotic arm 41 is movable by a suitable drive means 49 and has a plurality of ID tag pick up elements 51 as, for example, pins having vacuum ports at a free end. When removing ID tags 15 from the magazine 45, the robotic arm 41 moves into a position over the magazine having each of the pins over a respective storage mechanism 47 and by moving downwardly will engage and attach to the uppermost ID tag 15. The pick up elements 51 will then move upwardly and to a position for movement into the thermoforming machine 1 with each of pick up element 51 being moved to a position adjacent to a respective mold component 13. The just described up and down movements for operation picking ID tags would be reversed for a bottom feed style magazine. The robotic arm 41 will then move each of the pick up elements 51 into a position relative to the respective mold component 13 for depositing of an ID tag 15 onto each of the mold components 13. Further movement of the robotic arm 41 will move the ID tag 15 into contact with a respective mold component, then release the retained ID tag and deposit the ID tag onto the respective mold component 13. The deposited ID tags 15 are retained to the mold component 13, as for example, by being retained within a pocket 37 and can have a vacuum applied thereto to further assist in their selective retention to a respective mold component. Additionally or alternatively, a light adhesive could be used on each of the ID tags 15 to help retain them in position on their respective mold component. After the depositing the ID tag 15, the robotic arm 41 will move away from the thermoforming machine after which the material 12 will move to its position in the thermoforming machine and be formed into article 38 precursors. After the article 38 precursors are formed, the formed material 12 will then be moved to a machine for separating the formed article 38 precursors from one another such as in a machine described in the referenced co-pending patent application.

The present invention is better understood by a description of the method of operation. With regard to the embodiment of the invention shown in FIG. 6, a sheet of material 12 either as a continuous web or in discrete individual sheets is fed into the thermoforming machine 1. The material may be heated before entering the machine or after entering the machine. Heating is sufficient to permit forming of the material 12, but is not enough to melt the material. Force is applied to the material 12 after it is heated which force can be applied by means of a vacuum applied through the mold half 8 and thus applied to a first side 50 of the sheet creating a pressure differential on the material. A second side 52 of the sheet may have a positive pressure applied to create the pressure differential to urge the heated material to conform to the shape of the mold components 13. A pressure box, not shown, may be utilized as is known in the art. Additionally, two mold sections 8, 7, a male and female mold component 13, 14, may be utilized and can be used to provide a mechanical force to the heated sheet. It is to be understood that any of the three forms of force application can be utilized either individually or in any combination of the three. The ID tags 15 such as an RFID may be in position prior to formation of the article 38 precursors, or may be placed into contact with the heated material 12 after the formation of the article precursors. During forming, the pocket 42 may be formed. An ID tag 15 may be held in place on the article 38 and its precursor by either a mechanical interlock with the material of the article 38 and/or through the use of an adhesive, for example, a heat sensitive adhesive. One surface 44 may be left exposed. After the material 12 has been formed into article 13 precursors, the formed material is removed from the forming press 2. This can be done by ejector pins, positive pressure applied through a plurality of vents in the mold and if two mold halves 7, 8 are used the mold halves 7, 8 are separated from one another prior to ejection of the formed material from the mold. When mechanical interlocking is used to attach an ID tag 15 to the formed material, the material 12 should still be warm enough to allow the ID tag to be used to effect mechanical attachment as by forming a retention pocket 39 for itself within the article 38 precursor thus formed. A cooling fluid may be supplied to the mold halves 7, 8 to help maintain the mold at the desired temperature for cooling of the thermoformed material.

For the embodiment of the invention shown FIG. 7, the robotic arm 41 removes the appropriate number of ID tags 15 from the magazine 45 and moves them to the appropriate position over the mold components 13 onto which they are to be placed. The ID tags are then deposited on respective mold components 13 at the appropriate location. The robotic arm 41 will then move away from the mold components 13. Material 12 either in the form of a continuous web or discrete sheets is moved into position in the thermoforming machine and the thermoforming is accomplished as described above by either using a negative pressure applied through holes in the mold half 8, a combination of vacuum with positive pressure applied to the opposite side 52 of the material 12 or positive pressure alone applied from the opposite side 52 and/or the combination of a negative pressure, positive pressure and mechanical force from a second mold component. The material 12 may also be formed utilizing only mechanical force from the opposing mold half 7. The material is preferably soft enough, if the securement is to be by mechanical interlocking, so that the ID tag 15 will form its own pocket in the material during the thermoforming process. The ID tag may also be provided with a heat sensitive adhesive that will secure the identification tag to the article 38 precursors.

Other modifications and applications are likewise envisioned to the above-described processes and apparatus.

As is evident from the foregoing description, certain aspects of the present invention are not limited by the particular details of the disclosure herein, and it therefore contemplated that other modifications and applications or equivalents thereof will occur to those skilled in the art. The use of inclusive terms such as having and including is not in the sense of required, but in the sense of optional or desired. It is accordingly intended that the claims shall cover all such modifications and applications that do not depart from the spirit and the scope of the present invention. Other aspects, objects and advantages of the present invention can be obtained from a study of the drawings, the disclosure, and the appending claims.

The invention claimed is:

1. A method of securing a product identification tag to a heat formed article, said method comprising:
    removing a product identification tag from a source of tags;
    moving said removed tag to a position adjacent to a mold component;
    moving a heat formable material to a position adjacent the positioned tag and mold component separately from said moving said removed tag;
    heating the heat formable material to a temperature to permit heat forming of the material, but below its melting temperature;
    moving the heated material into contact with the mold component;
    forming the heat formable material to conform generally to the shape of a portion of the mold component and over a portion of the tag; and
    attaching the removed tag to the heated material during the forming of the material.

2. The method of claim 1 wherein the attaching being by mechanical interengagement between the tag and the material.

3. The method of claim 2, wherein a portion of the heated material being formed to interengage with a portion of the tag.

4. The method of claim 1 wherein the attaching of the tag to the material being by adhesion.

5. The method of claim 4 including applying hot melt adhesive to at least one of the tag and the material to effect the attaching by adhesion.

6. The method of claim 4 wherein the adhesion is at least partially accomplished with heat sensitive adhesive.

7. The method of claim 4 wherein the adhesion is at least partially accomplished by applying adhesive to the tag before the forming.

8. The method of claim 1 wherein the moving of the removed tag including moving the removed tag through a portion of said mold component.

9. The method of claim 1 wherein the moving of the removed tag including moving the removed tag into contact with an exposed portion of the mold component and then moving the heat formable material into attaching engagement with the tag.

10. The method of claim 1 wherein the tag including an RFID tag.

11. The method of claim 1 including forming an open faced pocket around a portion of the tag.

12. The method of claim 1 wherein the forming of the heat formable material forms at least one consumer product package.

13. The method of claim 1 wherein the forming of the heat formable material forms at least one consumer product.

14. The method of claim 1 wherein the heat formable material including polymeric material.

15. The method of claim 1 wherein the forming and the moving being part of a thermoforming process.

16. The method of claim 15 wherein the thermoforming process including the application of a vacuum.

17. An apparatus for thermoforming a molded article with an attached identification tag, said apparatus including:
    at least one mold component;
    a feed device adapted to selectively feed a sheet of thermoformable material to a position adjacent the mold component;
    a heater adapted to heat the thermoformable material to a temperature sufficient for thermoforming;
    a force applying device associated with the mold component and operable to
    apply force to the thermoformable material and conform the thermoformable material generally to at least a portion of the mold component; and
    a transport mechanism associated with the mold and operable to move an identification tag from a source to a position adjacent an exposed surface of the mold component for positioning between the exposed surface and the thermoformable material and attachment to the thermoformable material formed by the mold component.

18. The apparatus of claim 17 wherein the transport mechanism including an elevating mechanism adapted to move the tag to a generally upwardly facing surface of the mold component.

19. The apparatus of claim 18 wherein the elevating mechanism including a pin movably mounted in the mold component and having a free end adapted to receive a tag on a first surface thereof, said first surface forming a portion of an exposed molding surface of the mold component.

20. The apparatus of claim 19 including a vacuum source operably associated with the first surface to releasably secure a tag in position on the pin.

21. The apparatus of claim 19 wherein the mold component having a generally upwardly facing second surface and said robotic arm being operable to deposit a tag on said second surface.

22. The apparatus of claim 21 including a vacuum source operably associated with the attachment member to releasably secure a tag in position on the attachment member.

23. The apparatus of claim 22 including a retainer mechanism associated with the mold component operable to releasably retain a tag adjacent a molding surface of the mold component.

24. The apparatus of claim 23 wherein the retainer mechanism including a vacuum source communicating with a port opening on a surface of the attachment member.

25. The apparatus of claim 17 wherein the transport mechanism including a robotic arm with at least one attachment member movable between a tag pickup position and a tag depositing portion and operable to selectively move a tag from its pickup position to its deposting position adjacent the mold component.

26. The apparatus of claim 17 wherein the mold component including a male mold portion.

27. The apparatus of claim 17 wherein the mold component including a female mold portion.

28. The apparatus of claim 17 wherein the mold component including a male mold portion and a female mold portion.

29. The apparatus of claim 17 wherein the force applying device including a vacuum source in flow communication with a port adjacent the mold component operable to reduce air pressure adjacent the mold component.

* * * * *